Feb. 1, 1949. M. E. TEAGUE 2,460,403
AUTOMATIC DUMP BODY
Filed May 8, 1945 2 Sheets-Sheet 1
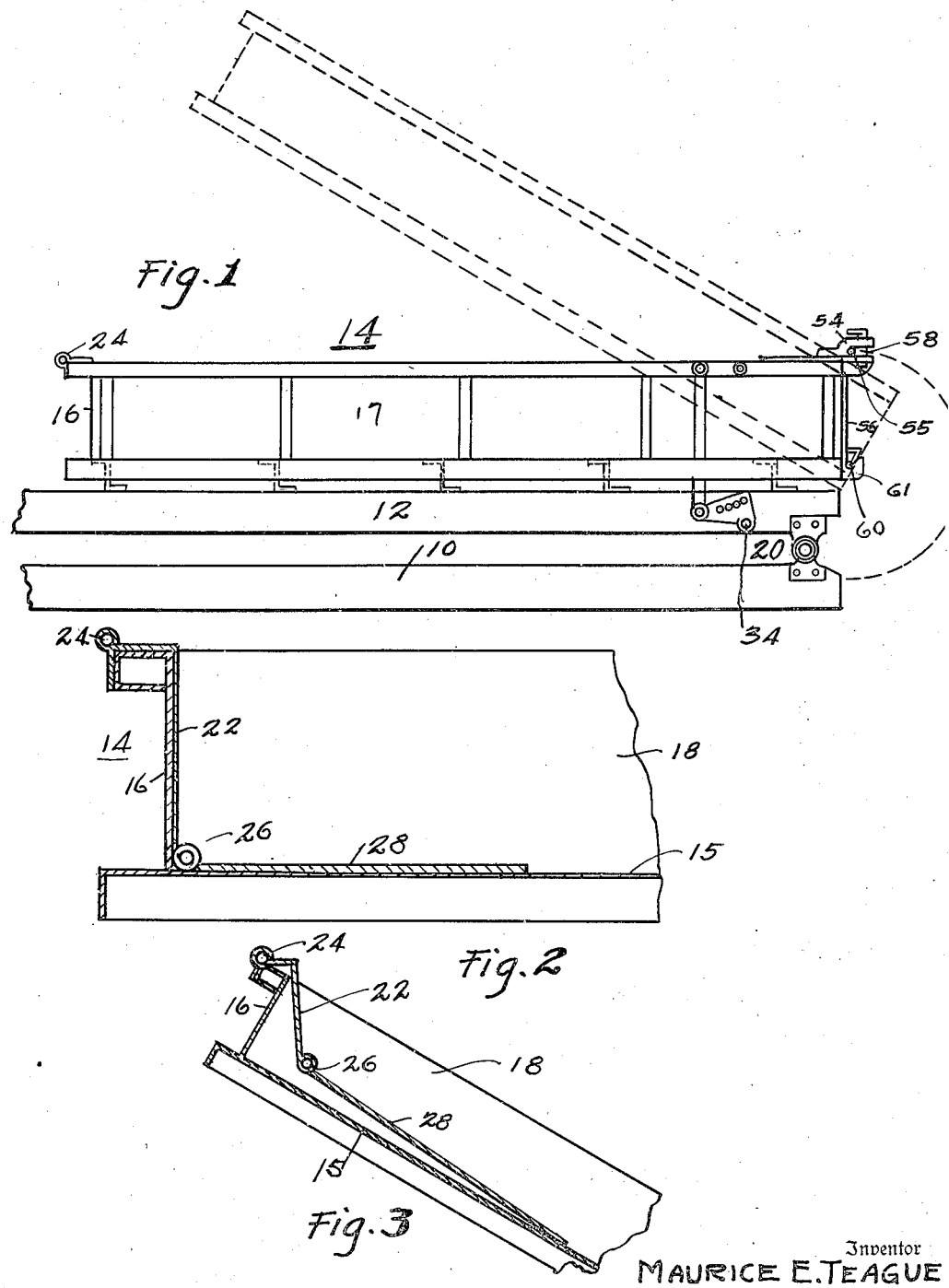
Inventor
MAURICE E. TEAGUE
By Herbert E. Smith
Attorney Feb. 1, 1949.  M. E. TEAGUE  2,460,403
AUTOMATIC DUMP BODY
Filed May 8, 1945  2 Sheets-Sheet 2
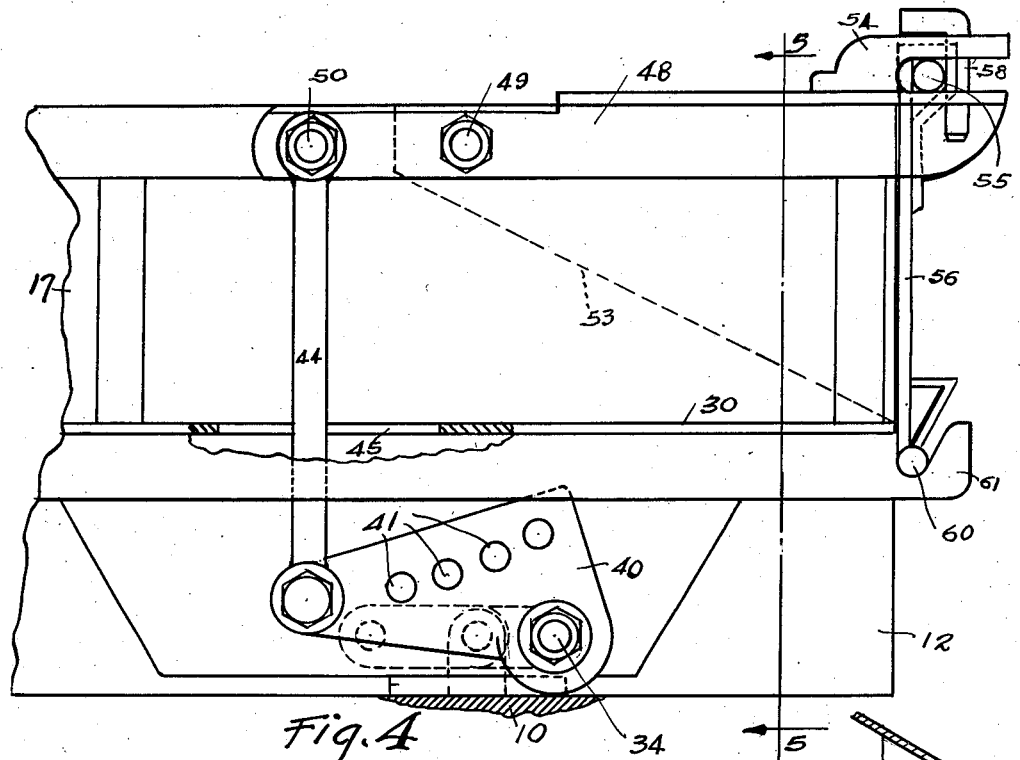
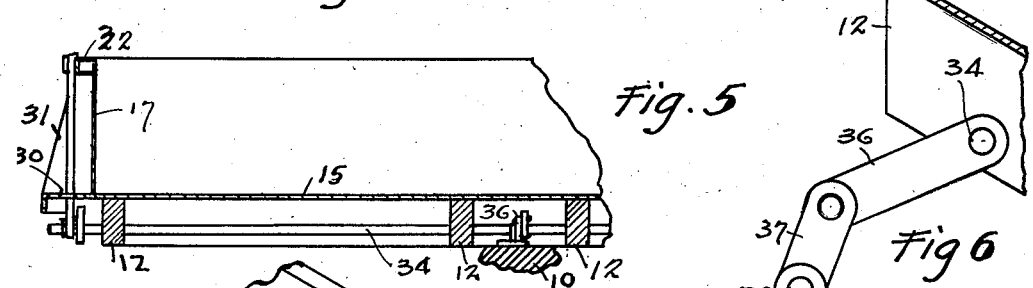
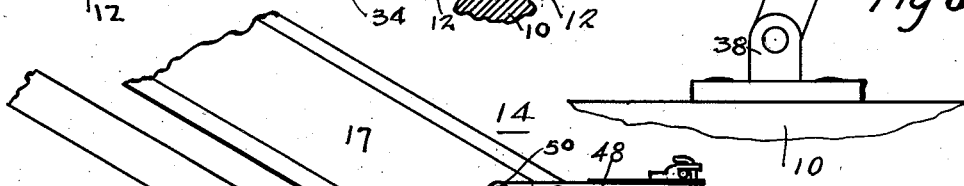
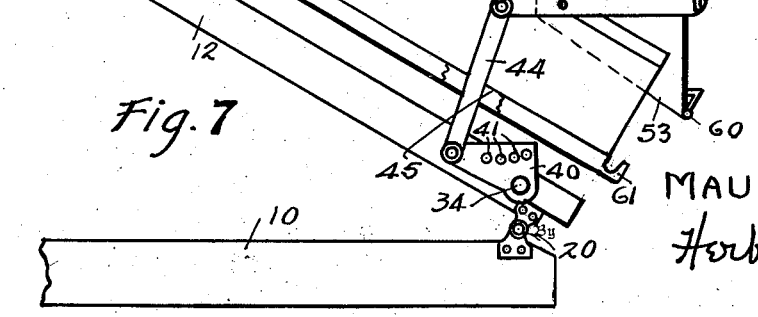
Inventor
MAURICE E. TEAGUE
Herbert E. Smith
Attorney Patented Feb. 1, 1949

2,460,403

UNITED STATES PATENT OFFICE 2,460,403

AUTOMATIC DUMP BODY

Maurice E. Teague, Cheney, Wash.

Application May 8, 1945, Serial No. 592,673

2 Claims. (Cl. 298—23)

This invention relates to an automatic dump body and, more particularly, is a dump body that will automatically dislodge and pass out the tail end a load of fluid materials under controlled spreading conditions.

It has been my experience with the truck bodies of the prior art that they require unnecessary attention from the drivers in the dislodgement of the load, especially from the front portion of the body and that they do not include practical or useful gate structures that can be operated merely by raising the body to dumping inclination.

Having these and other objections of the prior art in mind, it is an object of this invention to provide a dump truck that will readily dislodge the forward portion of the load in an automatic manner without requiring hammering or prying by the attendant.

Another object of the invention is the provision, in a dump truck of the type mentioned, of an automatic tail-gate that will open a predetermined degree without requiring the operator to do other than to elevate the body to a suitable inclined position.

A still further object of the invention is to provide in a dump truck body a gate operating linkage system that will function automatically to open the tail gate when the body is raised to dumping inclination.

The foregoing objects and others ancillary thereto I prefer to accomplish as follows:

According to a preferred embodiment of my invention, I dispose within the front of a dump body an upright plate hinged near the top to the upper forward portion of the body and having hinged thereto a false bottom plate to lie within the forward bottom portion of the dump body. The rear gate of the body is formed of a plate provided with lateral extending trunnions at both the upper and the lower corners. The lower trunnions operate in hooks at the lower corners of the body and the upper trunnions operate in forks at the upper corners of the body. Each fork is carried on the rear end of a lever intermediately pivoted to the side of the body in a manner that when the forward end of the lever is depressed the fork and the depending gate is swung relative the opening that it normally closes. Mounted in the joists of the tiltable body is a cross shaft carrying at each end a crank arm having a crank pin radially swingable about said shaft. Between the crank pin and the gate lever is a link which operates to swing the lever when the crank is revolved. Movement of the crank and the cross shaft to which it is secured is obtained by a pair of links between the main truck frame and the cross shaft. One of said links is pivoted to the main frame and to the other link and the latter is secured as a crank arm to the cross shaft. With this arrangement, lifting of the dump body produces a depressing force upon the links connected to the forward ends of the gate levers and the gate is raised. Attached to the gate levers are side walls to close the sides of the opening produced when the gate is raised during dumping.

The novel features that I consider characteristic of my invention are set forth with particularity in the appended claims. The invention, however, both as to its organization and its method of operation, together with additional objects and advantages thereof, will best be understood from the following description of a specific embodiment when read in connection with the accompanying drawings, in which, Fig. 1 is a side elevation view of a dump truck body equipped according to my invention;

Fig. 2 is an enlarged longitudinal sectional view of the forward portion of the body in the lowered position and Fig. 3 is a similar view of the same in the elevated position;

Figure 4 is an enlarged side view of a rear fragment of the dump body with portions broken away and omitted for convenience of illustration;

Fig. 5 is a cross sectional view taken on line 5—5 of Fig. 4;

Fig. 6 is a detailed view of the links between the main truck frame and the sub-frame whereby rotation of the cross shaft is obtained; and Fig. 7 is a side view, in elevation, of the tail gate in elevated dumping position and the body inclined for dumping.

Referring to the drawings, there will be seen a truck main frame 10 that is normally supported upon ground engaging members (not shown). Superposed upon frame 10 are the body joists 12 upon which are mounted the dump body 14 comprising the normal bottom 15, front wall 16, and side walls 17 and 18.

Between frames 10 and 12 is provided the pivot 20 whereby the two frames may be spread apart as shown from Fig. 1 to Fig. 7, usually by screw or expansible cylinder means of conventional use and not shown for convenience of illustration.

In the forward portion of the body is placed the upright plate 22 hinged at 24 to the upper forward edge of the body 14 and having a lower hinge connection 26 to the false bottom plate 28. When the dump body is in the normal substantially horizontal position plates 22 and 28 appear as in Fig. 2, but when the body is inclined they freely shift to the positioning of Fig. 3. In this manner that portion of the load of bulk material that has been deposited in the body will be shifted rearward and so tilted by the raising of the center of gravity that it will freely run out of the body and thus obviate the heretofore necessary hammering, pounding and prying so commonly required of the operators to dislodge this portion of the load.

As can be seen in Fig. 5, the bottom 15 is extended externally of the sides to form a shelf 30 and a web brace 31 extends therefrom to the bead edge 32 to stiffen the body. In the joists 12 lateral of the body is rotatably mounted cross shaft 34 which extends outward to under the shelves 30. Somewhere near the middle, shaft 34 has crank arm 36 which is pivotally coupled to link 37 that is in turn pivoted to ear 38 that is attached to the frame 10. When the body is elevated the action of link 37 and arm 36 is to produce a slight rotation of shaft 34, in a counter-clockwise direction as shown in Fig. 6.

At each end, shaft 34 has secured thereto the crank plate 40 which is provided with a series of holes 41 to which link 44 may be selectively attached at various radial distances and positions from the axis of shaft 34 to vary the draft upon link 44 to meet conditions of use of the mechanism. Links 44 each rise upwardly from a connection with a crank plate 40 and pass through a suitable slot 45 in the shelf 30 and lie alongside the outside adjacent of the body side wall.

An angle-iron lever 48 is pivoted to the upper edge of each side wall by means of pin 49 and has a pivotal connection 50 with the upper end of link 44. When the body is raised pivot 49 revolves about the axis of pivot 20 between frame 10 and joists 12 as also does the shaft 34. However, shaft 34 is itself rotated about its own axis by means of crank 36 and link 37. This rotation of shaft 34 results in swinging of crank plate 40 and an accelerated draft is applied to the link over and beyond the action obtainable if link 44 were attached only to the frame 10 by a fixed pivot.

Lever 48 carries depending therefrom within the body a triangular plate 53 which serves as a guide and also as a side wall in the opening produced when the tail gate is raised, at which time it rests against the rear edge of the tail gate 56. On its rear end, lever 48 has fork 54 in which is mounted an upper trunnion 55 of the tail gate 56. A pin 58 passed through the tines of fork 54 retain the trunnion in the fork during lifting of the gate.

At each of the lower corners of the gate 56 is a trunnion 60 which is normally seated in hook 61 carried by the rear lower corners of the dump body. When it is desired to drop the tail gate to a non-upright position, pin 58 is withdrawn and such may be accomplished with the tail gate being positioned as is customary with chains or other stop means.

By the tail gate elevating means, it is possible to elevate the same merely by raising the dump body to any of its inclined positions.

Since the degree of raise of the tail gate may be controlled through adjustments in the connection of link 44 in any of the holes 41, the operator is easily enabled to control a gravel spreading operation, for example. If the bulk material being handled is free-flowing, the body need only be raised slightly and a predetermined opening of the bottom of the tail gate with respect to the truck bottom arranged for, and a desired spread will be had. Bulk material which is not so free-flowing may require greater inclination of the dump body while still the same opening is had. In the latter case the operator merely adjusts his link connection to crank plate 40 and proceeds in the normal manner.

For normal use the tail gate is provided with the trunnions 60 extending beyond the two ends of the tail gate 56 and along the bottom edge. The trunnions seat in the hooked ends 61 and by drawing the pins 58, the tail gate is free to swing outward and downward in a full arc of 180 degrees or it may be fixed at the horizontal or any other degree by the usual chains commonly used for that purpose, thus providing for hauling material that has to extend or that is longer than the capacity of the truck body.

Although I have shown and described certain specific embodiments of my invention, I am fully aware that many modifications thereof are possible. My invention, therefore, is to be limited only by the spirit of the appended claims as equivalents obviously can be substituted within the skill of the mechanic without departing from the principles of the invention.

Having thus described my invention, I claim:

1. In a dump body that is pivotally mounted upon a frame and swings to inclined position relative thereto, tail gate elevating means, comprising a tail gate to close said body at the rear when in the normal horizontal position, a lever connected to each upper corner of said body and extending forward alongside said dump body and having pivotal connection therewith intermediate its ends, a link depending from each said lever forward of its pivotal connection to said body, a guide plate depending from said lever within said body along the side wall thereof, said guide plate extending forward from the rear end of said lever, a cross shaft lateral of said body therebelow and having a crank plate on each end, each said link and the adjacent crank plate being pivotally interconnected and crank means between said cross shaft and said frame.

2. In a dump body that is pivotally mounted upon a frame and swings to inclined position relative thereto, a tail gate to close said body at the rear, a lever extending alongside said dump at each side thereof adjacent the top edge thereof and having pivotal connection with said body at a distance from the tail gate, link means operable by elevation of said body to inclined position to turn said levers on their pivotal connections with the body to elevate the gate, said levers each having a triangular guide plate thereon extending over the adjacent side of the body and downwardly inside the body forming stops for the gate, rearwardly facing forks at the rear ends of said levers, trunnions at the top of the tail gate received in said forks, pins releasably holding the trunnions in the forks, trunnions at the bottom of the gate and upwardly and outwardly opening hook means on the body receiving the last named trunnions, whereby the tail gate may be swung outwardly about the lower trunnions when the body is level and lifted by said levers as the body is titled.

MAURICE E. TEAGUE.

REFERENCES CITED

The following references are of record in the file of this patent:

UNITED STATES PATENTS

| Number | Name | Date |
|---|---|---|
| 1,288,678 | Raymond | Dec. 24, 1918 |
| 1,808,251 | Osman | June 2, 1931 |
| 1,821,384 | Larson | Sept. 1, 1931 |
| 2,213,385 | Dailey | Sept. 3, 1940 |